United States Patent
Umehara et al.

(10) Patent No.: US 12,235,881 B2
(45) Date of Patent: Feb. 25, 2025

(54) VECTOR ACQUISITION METHOD, VECTOR ACQUISITION APPARATUS, AND RECORDING MEDIUM

(71) Applicant: SCREEN HOLDINGS CO., LTD., Kyoto (JP)

(72) Inventors: Koki Umehara, Kyoto (JP); Kiyotaka Kasubuchi, Kyoto (JP); Akiko Yoshida, Kyoto (JP); Manri Terada, Kyoto (JP); Yuki Sumiya, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 334 days.

(21) Appl. No.: 17/669,625

(22) Filed: Feb. 11, 2022

(65) Prior Publication Data

US 2022/0292124 A1 Sep. 15, 2022

(30) Foreign Application Priority Data

Mar. 15, 2021 (JP) .................. 2021-041736

(51) Int. Cl.
| | |
|---|---|
| *G06F 16/335* | (2019.01) |
| *G06F 16/334* | (2025.01) |
| *G06F 16/355* | (2025.01) |
| *G06F 40/247* | (2020.01) |
| *G06F 40/53* | (2020.01) |
| *G06N 20/00* | (2019.01) |

(52) U.S. Cl.
CPC ........ *G06F 16/3347* (2019.01); *G06F 16/355* (2019.01); *G06F 40/247* (2020.01); *G06F 40/53* (2020.01); *G06N 20/00* (2019.01)

(58) Field of Classification Search
CPC ... G06F 16/3347; G06F 16/355; G06F 40/247
See application file for complete search history.

(56) References Cited

U.S. PATENT DOCUMENTS

| | | | |
|---|---|---|---|
| 2018/0025271 A1 | 1/2018 | Sawada et al. | |
| 2019/0362020 A1* | 11/2019 | Paulus | ............. G06F 18/24143 |
| 2020/0285808 A1* | 9/2020 | Yoshida | ................ G06F 40/237 |

FOREIGN PATENT DOCUMENTS

| | | |
|---|---|---|
| EP | 3 683 695 A1 | 7/2020 |
| JP | 2020-074205 A | 5/2020 |

OTHER PUBLICATIONS

Extended European Search Report issued in corresponding European Patent Application No. 22156012.1-1203, dated Jul. 26, 2022.
Examination Report dated Sep. 24, 2024, from corresponding European Application No. 22156012.1, 5 pages.

* cited by examiner

*Primary Examiner* — Ibrahim Siddo
(74) *Attorney, Agent, or Firm* — Rimon P.C.

(57) ABSTRACT

A vector acquisition method includes: inputting, into a learned model, at least one piece of text including at least two of a plurality of words obtained by dividing a compound, the compound being a word divisible into the plurality of words; outputting, from the learned model, an adjusted vector corresponding to at least one of the words obtained by dividing the compound in the input piece of text; and acquiring a compound vector corresponding to the compound using the adjusted vector output from the learned model. Classification accuracy of vectors corresponding to words can thereby be enhanced.

9 Claims, 9 Drawing Sheets

F I G. 2
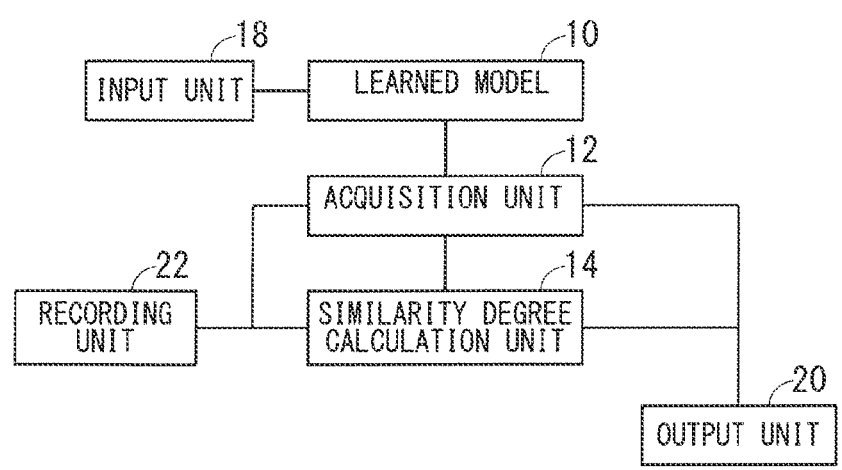

FIG. 5

| INPUT PIECE OF TEXT | プリント | 回路 | 基 | 板 | の | トレース | を | 形成 | 。 |
|---|---|---|---|---|---|---|---|---|---|
| VECTOR | $T_1$ | $T_2$ | $T_3$ | $T_4$ | $T_5$ | $T_6$ | $T_7$ | $T_8$ | $T_9$ |

FIG 6

| WORD OBTAINED BY DIVIDING COMPOUND | 回路 | 基 | 板 |
|---|---|---|---|
| VECTOR | $T_2$ | $T_3$ | $T_4$ |

FIG. 7

| | COMPOUND | SYNONYM 1 | SYNONYM 2 | SYNONYM 3 | SYNONYM 4 |
|---|---|---|---|---|---|
| WITHOUT ADJUSTMENT | POLISHING STEP | CLEANING STEP | MANUFACTURING STEP | PROCESSING STEP | STEP PRINTING |
| WITH ADJUSTMENT | POLISHING STEP | POLISHING OPERATION | POLISHING PROCESS | POLISHING SYSTEM | POLISHING PROCESSING |

FIG. 8

| INPUT PIECE OF TEXT | Traces | are | formed | on | a | printed | circuit | board | |
|---|---|---|---|---|---|---|---|---|---|
| VECTOR | $T_1$ | $T_2$ | $T_3$ | $T_4$ | $T_5$ | $T_6$ | $T_7$ | $T_8$ | $T_9$ |

FIG. 9

| WORD OBTAINED BY DIVIDING COMPOUND | printed | circuit | board |
|---|---|---|---|
| VECTOR | $T_6$ | $T_7$ | $T_8$ |

VECTOR ACQUISITION METHOD, VECTOR ACQUISITION APPARATUS, AND RECORDING MEDIUM

BACKGROUND OF THE INVENTION

Field of the Invention

Technology disclosed in the description of the present application relates to acquisition of vectors corresponding to words.

Description of the Background Art

Technology of assigning words corresponding vectors, and using the vectors to calculate a degree of similarity between words has been known (see Japanese Patent Application Laid-Open No. 2020-74205, for example).

In a case where a degree of similarity between words is calculated as described above, vectors held by a learned model in advance and corresponding to the respective words can be used.

The above-mentioned vectors held by the learned model are generated by learning using many pieces of text, so that the degree of similarity between words can easily be calculated by using the above-mentioned vectors held in advance.

On the other hand, when corresponding vectors are not held by the learned model or when classification accuracy of the vectors held by the learned model is insufficient, the degree of similarity between words sometimes cannot be calculated with high accuracy.

SUMMARY

The present invention is directed to a vector acquisition method, a vector acquisition apparatus, and a recording medium.

One aspect of the present invention is a vector acquisition method using a learned model holding initial vectors corresponding to respective words, and capable of outputting, for input of a piece of text including a plurality of words, adjusted vectors corresponding to the respective words in the piece of text, the initial vectors being vectors learned in advance, the adjusted vectors being vectors obtained by adjusting the initial vectors, the vector acquisition method including: inputting, into the learned model, at least one piece of text including at least two of a plurality of words obtained by dividing a compound, the compound being a word divisible into the plurality of words; outputting, from the learned model, an adjusted vector corresponding to at least one of the words obtained by dividing the compound in the input piece of text; and acquiring a compound vector corresponding to the compound using the adjusted vector output from the learned model.

The compound vector corresponding to the compound can be acquired using the adjusted vector, so that classification accuracy of the compound vector can be improved.

Another aspect of the present invention is a vector acquisition apparatus using a learned model holding initial vectors corresponding to respective words, and capable of outputting, for input of a piece of text including a plurality of words, adjusted vectors corresponding to the respective words in the piece of text, the initial vectors being vectors learned in advance, the adjusted vectors being vectors obtained by adjusting the initial vectors, the vector acquisition apparatus including: an input unit to input, into the learned model, at least one piece of text including at least two of a plurality of words obtained by dividing a compound, the compound being a word divisible into the plurality of words; an acquisition unit to acquire a compound vector corresponding to the compound using an adjusted vector output from the learned model and corresponding to at least one of the words obtained by dividing the compound in the input piece of text.

The compound vector corresponding to the compound can be acquired using the adjusted vector, so that the classification accuracy of the compound vector can be improved.

Yet another aspect of the present invention is a recording medium storing a vector acquisition program using a learned model and having a plurality of instructions capable of being executed by a computer to be executed by one or more processors, the learned model holding initial vectors corresponding to respective words, and capable of outputting, for input of a piece of text including a plurality of words, adjusted vectors corresponding to the respective words in the piece of text, the initial vectors being vectors learned in advance, the adjusted vectors being vectors obtained by adjusting the initial vectors, the vector acquisition program being installed on a computer and executed to: cause, using the plurality of instructions to be executed by the one or more processors, the computer to input, into the learned model, at least one piece of text including at least two of a plurality of words obtained by dividing a compound, the compound being a word divisible into the plurality of words; and cause the computer to acquire a compound vector corresponding to the compound using an adjusted vector output from the learned model and corresponding to at least one of the words obtained by dividing the compound in the input piece of text.

The compound vector corresponding to the compound can be acquired using the adjusted vector, so that the classification accuracy of the compound vector can be improved.

It is thus an object of the present invention to enhance classification accuracy of vectors corresponding to words.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows an example of a functional configuration of the vector acquisition apparatus according to the embodiment;

FIG. 5 shows a specific example of operation to acquire a compound vector and, further, calculate a degree of similarity of a compound;

FIG. 6 shows a specific example of the operation to acquire the compound vector and, further, calculate the degree of similarity of the compound;

FIG. 7 shows a specific example of the operation to acquire the compound vector and, further, calculate the degree of similarity of the compound;

FIG. 8 shows another specific example of the operation to acquire the compound vector and, further, calculate the degree of similarity of the compound; and FIG. 9 shows another specific example of the operation to acquire the compound vector and, further, calculate the degree of similarity of the compound.

DESCRIPTION OF THE PREFERRED EMBODIMENTS

Figure 1:
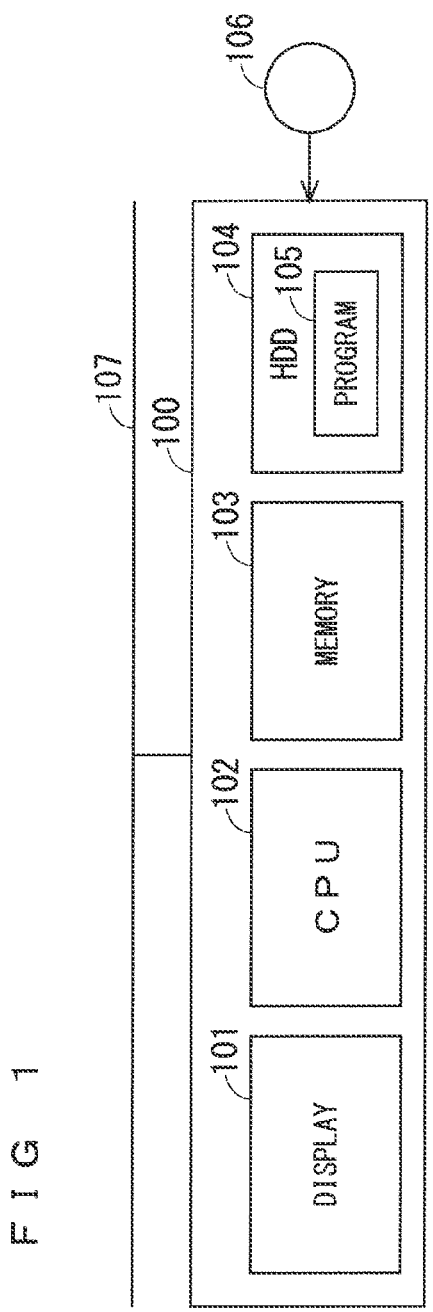
FIG. 1 shows an example of a hardware configuration of a vector acquisition apparatus according to an embodiment.

An embodiment will be described below with reference the accompanying drawings. In the embodiment below, detailed features and the like are shown for description of technology, but they are examples and are not necessary features to implement the embodiment.

The drawings are schematically shown, and configurations are omitted or simplified in the drawings as appropriate for convenience of description. The sizes of and a positional relationship among configurations shown in different drawings are not necessarily accurate, and can be changed as appropriate. Hatching is sometimes applied to drawings other than a cross-sectional view, such as a plan view, for ease of understanding of the embodiment.

In description made below, similar components bear the same reference signs, and have similar names and functions. Detailed description thereof is thus sometimes omitted to avoid redundancy.

In description made in the description of the present application, an expression "comprising", "including", or "having" a certain component is not an exclusive expression excluding the presence of the other components unless otherwise noted.

In description made in the description of the present application, ordinal numbers, such as "first" and "second", are used for the sake of convenience for ease of understanding of the embodiment, and an order and the like in the embodiment are not limited to an order represented by the ordinal numbers.

Embodiment

A vector acquisition apparatus, a vector acquisition method, and a vector acquisition program according to the present embodiment will be described below.

<Configuration of Vector Acquisition Apparatus>

FIG. 1 shows an example of a hardware configuration of a vector acquisition apparatus 100 according to the present embodiment.

As shown in an example of FIG. 1, the vector acquisition apparatus 100 is a computer on which at least a program 105 used for operation to acquire vectors corresponding to words has been installed, and includes a central processing unit (CPU) 102, memory 103, a hard disk drive (HDD) 104, and a display 101.

In the vector acquisition apparatus 100, the corresponding program 105 is installed on the HDD 104. The program 105 may be installed by writing data read from an external storage medium 106, such as a compact disc (CD), a digital versatile disc (DVD), and universal serial bus (USB) memory, to the HDD 104 or by writing data received via a network 107 to the HDD 104.

The HDD 104 may be replaced by other types of auxiliary storage devices. For example, the HDD 104 may be replaced by a solid state drive (SSD), a random access memory (RAM) disc, and the like.

In the vector acquisition apparatus 100, the program 105 installed on the HDD 104 is loaded into the memory 103, and the loaded program 105 is executed by the CPU 102. The computer thus executes the program 105, and functions as the vector acquisition apparatus 100.

Processing performed by the CPU 102 may at least partially be performed by a processor other than the CPU 102. For example, processing performed by the CPU 102 may at least partially be performed by a graphics processing unit (GPU) and the like. Processing performed by the CPU 102 may at least partially be performed by hardware not executing the program.

FIG. 2 shows an example of a functional configuration of the vector acquisition apparatus 100 according to the present embodiment.

As shown in an example of FIG. 2, the vector acquisition apparatus 100 at least includes an input unit 18 and an acquisition unit 12. The vector acquisition apparatus 100 can also include a learned model 10, a similarity degree calculation unit 14, a recording unit 22, and an output unit 20. The input unit 18 and the output unit 20 are achieved by the display 101 in FIG. 1, for example. The recording unit 22 is achieved by at least one of the memory 103 and the HDD 104 in FIG. 1, for example. The learned model 10, the acquisition unit 12, and the similarity degree calculation unit 14 are achieved by the CPU 102 in FIG. 1 executing the program 105.

The input unit 18 inputs data of a piece of text including a plurality of words into the learned model 10. Assume that the input piece of text includes a compound that is a word divisible into a plurality of words.

The learned model 10 is a learning model subjected to machine learning in advance using a neural network and the like. The learned model 10 includes an input layer to receive input of data of a piece of text divided into words and the like by preprocessing, such as morphological analysis, an embedding layer to assign (embed) multi-dimensional vectors as dispersion representations to respective words in data output from the input layer, and hidden layers to adjust vectors (weights) assigned to respective words output from the embedding layer.

The embedding layer holds vectors (i.e., initial vectors) for respective words acquired by learning using a large quantity of learning data.

The hidden layers are provided in a plurality of tiers, and the vectors (weights) are adjusted in a hidden layer in each of the tiers. A hidden layer in the last tier of the plurality of tiers is herein referred to as a last hidden layer.

As the learned model 10, a BERT model as a language encoding model based on a transformer can be used, for example. The learned model 10 is not limited to the BERT model, and may be OpenAI GPT, ALBERT, XLNet and the like based on the transformer.

The learned model 10 is described in the present embodiment as a configuration included in the vector acquisition apparatus 100, but may be provided external to the vector acquisition apparatus 100, and may be referred to in response to operation of the vector acquisition apparatus 100.

The learned model 10 is described in the present embodiment to include up to the hidden layers, but may further include an output layer to perform output for any task using adjusted vectors, which will be described below.

The acquisition unit 12 acquires vectors (including the initial vectors and the adjusted vectors) from the learned model 10. The acquisition unit 12 can acquire the initial vectors from the embedding layer of the learned model 10. The acquisition unit 12 can acquire the adjusted vectors from the hidden layers (mainly from the last hidden layer) of the learned model 10. The acquired vectors can be recorded on the recording unit 22.

Furthermore, the acquisition unit 12 can generate and acquire a compound vector corresponding to the compound based on the vectors acquired from the learned model 10. The acquired compound vector can be recorded on the recording unit 22.

The similarity degree calculation unit 14 can calculate a degree of similarity between words. Specifically, the similarity degree calculation unit 14 can calculate a degree of similarity in cos between vectors corresponding to the respective words. The similarity degree calculation unit 14 can determine that the words are similar to each other when a value as calculated is greater than a predetermined threshold. The calculated degree of similarity and a corresponding result of determination can be recorded on the recording unit 22.

The output unit 20 can output at least the vectors (including the compound vector) acquired by the acquisition unit 12 or the degree of similarity calculated by the similarity degree calculation unit 14 and the corresponding result of determination.

Figure 3:
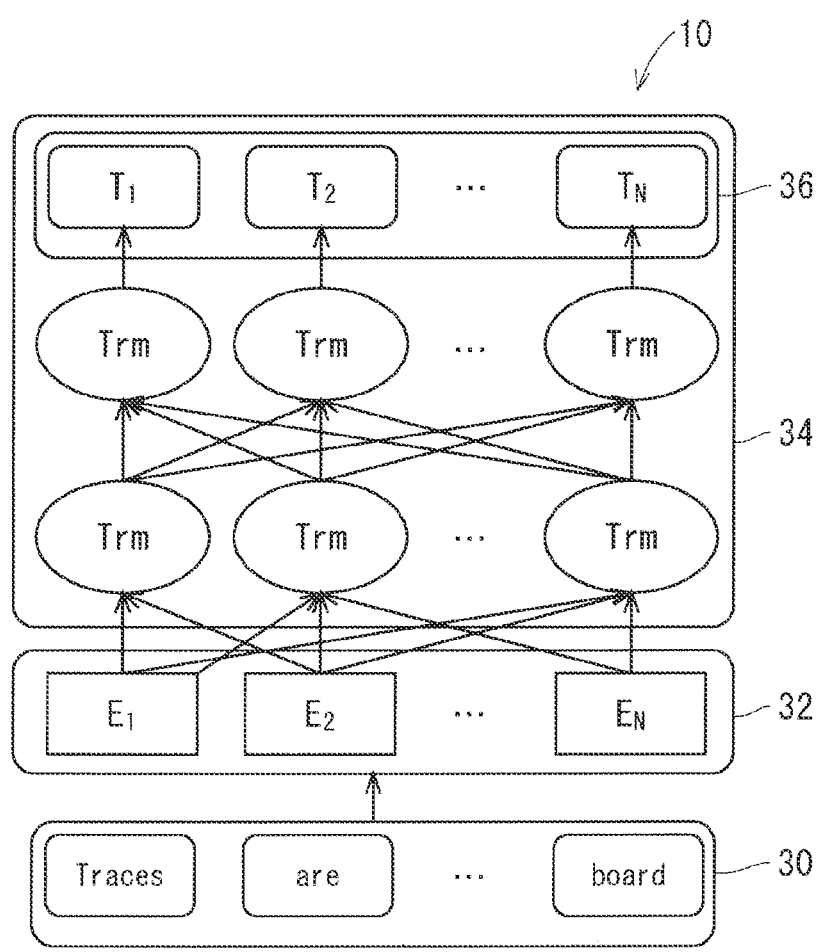
FIG. 3 shows an example of a learned model used in the embodiment.

An example of the learned model 10 will be described herein. FIG. 3 shows an example of the learned model 10 used in the present embodiment.

As shown in FIG. 3, the learned model 10 includes an input layer 30 to receive input of data of a piece of text divided into words and the like, an embedding layer 32 to assign multi-dimensional vectors to respective words in data output from the input layer 30, and hidden layers 34 (including a last hidden layer 36) to adjust vectors (weights) assigned to respective words output from the embedding layer 32.

As shown in FIG. 3, the hidden layers 34 are provided in a plurality of tiers, and the vectors (weights) are adjusted in stages in the hidden layers 34 in the respective tiers. A hidden layer in the last tier is herein referred to as the last hidden layer 36.

<Operation of Vector Acquisition Apparatus>

Figure 4:
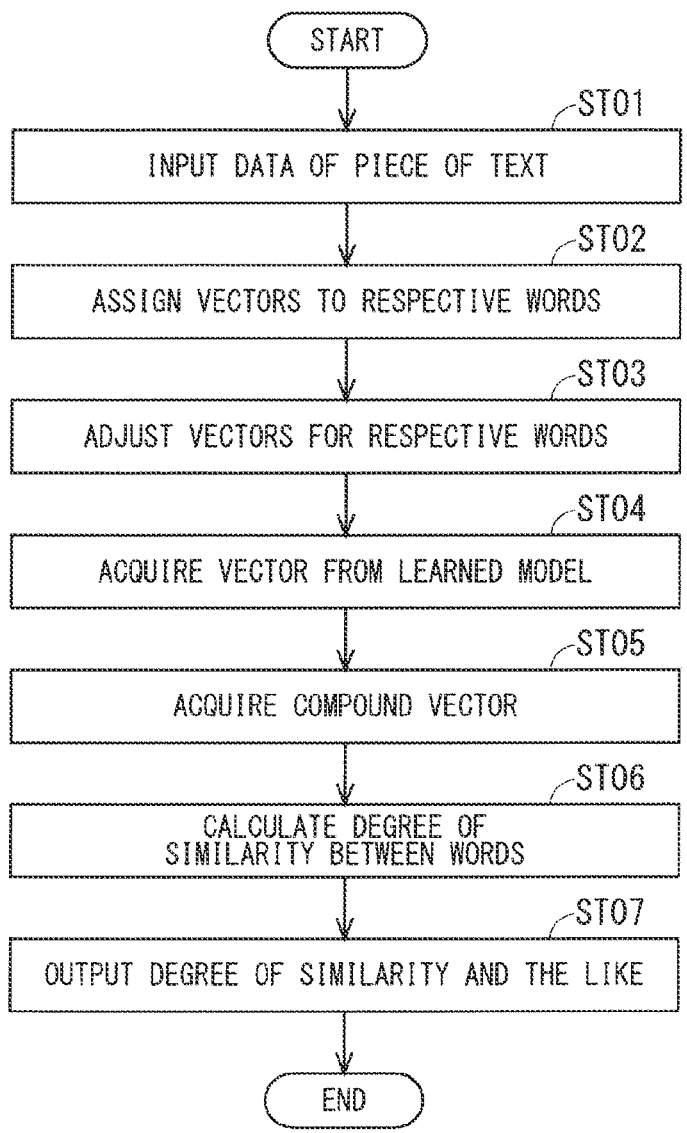
FIG. 4 is a flowchart showing an example of operation of the vector acquisition apparatus.

Operation (operation to acquire the compound vector and, further, operation to calculate the degree of similarity between words) of the vector acquisition apparatus 100 will be described next with reference to FIGS. 4, 5, 6, and 7. FIG. 4 is a flowchart showing an example of the operation of the vector acquisition apparatus 100.

As shown in an example of FIG. 4, the input unit 18 first inputs data of a piece of text including a plurality of words into the input layer 30 of the learned model 10 (step ST01 in FIG. 4). The data of the input piece of text is data of the piece of text divided into words and the like in advance by preprocessing, such as morphological analysis.

As described above, assume that the input piece of text includes a compound that is a word divisible into a plurality of words. Assume that the compound includes a word (hereinafter, referred to as a non-held word) corresponding to an initial vector not held by the learned model 10 in the present embodiment. The non-held word may not be included in the data of the input piece of text.

Next, in the embedding layer 32, vectors are assigned to respective words in data output from the input layer 30 of the learned model 10 (step ST02 in FIG. 4). The vectors (i.e., the initial vectors) for respective words acquired by learning using the large quantity of learning data are assigned in the present embodiment, but the initial vectors may be updated with the adjusted vectors.

The input piece of text herein includes the compound as the non-held word, so that an initial vector corresponding to the compound is not held by the learned model 10. Thus, the compound is further divided into words, and initial vectors are assigned to the respective words obtained by dividing the compound.

Even in a case where the compound in the input piece of text is not the non-held word (i.e., in a case where a compound vector corresponding to the compound is held as an initial vector by the learned model 10), initial vectors corresponding to respective words obtained by dividing the compound may be assigned to the respective words. For example, in a case where a compound vector corresponding to a compound specialized in a piece of text used in a specific field is desired, initial vectors corresponding to words obtained by dividing the compound can further be adjusted using the piece of text in the field, and a previously registered compound vector can be updated with a vector matching the specific field.

Next, in the hidden layers 34 in the plurality of tiers, vectors for respective words are adjusted (step ST03 in FIG. 4). By the adjustment, the context in the input piece of text is reflected, and the adjusted vectors obtained by adjusting the initial vectors are generated for the respective words.

Next, the acquisition unit 12 acquires a vector from the learned model 10 (step ST04 in FIG. 4).

The acquisition unit 12 can acquire vectors corresponding to all the words in the input piece of text, but acquires at least one adjusted vector corresponding to a word obtained by dividing the compound. The adjusted vector is acquired mainly from the last hidden layer 36.

Next, the acquisition unit 12 generates and acquires a compound vector corresponding to the compound based on vectors (including the at least one adjusted vector) corresponding to the respective words obtained by dividing the compound (step ST05 in FIG. 4). As a method for generating the compound vector, a (an arithmetic mean) method of combining vectors corresponding to all the words obtained by dividing the compound can be used, but other (e.g., geometrical mean or harmonic mean) methods may be used.

The vector acquisition apparatus 100 can thus acquire the compound vector corresponding to the compound.

Although a case where the compound itself is included in the input piece of text is shown in the above-mentioned example, the words obtained by dividing the compound may separately be arranged in the input piece of text or may be arranged in a different order from that in the compound in the input piece of text.

The input piece of text is only required to include at least two of the words obtained by dividing the compound. The number of input pieces of text is not limited to one, and another word obtained by dividing the compound and not included in the piece of text may be included in another input piece of text.

The acquisition unit 12 may not acquire adjusted vectors corresponding to all the words obtained by dividing the compound. That is to say, the acquisition unit 12 may acquire initial vectors corresponding to one or more of the words obtained by dividing the compound, and generate the compound vector using the initial vectors.

The acquisition unit 12 may generate adjusted vectors corresponding to the same words obtained by dividing compounds a plurality of times. Based on the adjusted vectors corresponding to the same words, the acquisition unit 12 may combine these vectors to generate only one corresponding vector, and use the generated vector to generate the compound vector, for example.

Furthermore, the similarity degree calculation unit 14 can calculate a degree of similarity between a word in the above-mentioned input piece of text and another word in the above-mentioned input piece of text (step ST06 in FIG. 4). In particular, the similarity degree calculation unit 14 can calculate a degree of similarity between the compound (including the non-held word) in the above-mentioned input piece of text and another word in the above-mentioned input piece of text. Furthermore, the similarity degree calculation unit 14 can determine that the words are similar to each other when the value as calculated is greater than the predetermined threshold.

In the above-mentioned example, words targeted for similarity degree calculation are limited to those in the same piece of text, but may span a plurality of pieces of text.

The output unit 20 can output at least the vectors (including the compound vector) acquired by the acquisition unit 12 or the degree of similarity calculated by the similarity degree calculation unit 14 and the corresponding result of determination, both of which are recordable on the recording unit 22 (step ST07 in FIG. 4). For example, words can be displayed by the display 101 in descending order of the degree of similarity.

FIGS. 5, 6, and 7 show specific examples of operation to acquire the compound vector and, further, calculate the degree of similarity of the compound as described above.

First, vectors are assigned to respective words in data of a piece of text input into the input layer 30 of the learned model 10. In FIG. 5, vectors $T_1$, $T_2$, $T_3$, $T_4$, $T_5$, $T_6$, $T_7$, $T_8$, and $T_9$ are respectively assigned to words "プリント" (printed), "回路" (circuit), "基" (basic), "板" (board), "の" (no), "トレース" (trace), "を" (wo), "形成" (form), and "。" (.) obtained by dividing by morphological analysis and the like.

The words "circuit", "basic", and "board" are herein originally a compound "circuit-basic-board", but are generated by dividing the compound.

Next, these vectors are adjusted in the plurality of tiers of the hidden layers 34 of the learned model 10.

Next, the acquisition unit 12 acquires a vector from the learned model 10. In particular, the acquisition unit 12 acquires adjusted vectors (the vectors $T_2$, $T_3$, and $T_4$ in FIG. 5) corresponding to the respective words obtained by dividing the compound as shown in FIG. 6.

Next, the acquisition unit 12 generates a vector corresponding to the compound (i.e., "circuit-basic-board") based on the vectors $T_2$, $T_3$, and $T_4$.

Next, the similarity degree calculation unit 14 calculates a degree of similarity between one word and another word.

FIGS. 8 and 9 show other specific examples of the operation to acquire the compound vector and, further, calculate the degree of similarity of the compound as described above.

First, vectors are assigned to respective words in data of a piece of text input into the input layer 30 of the learned model 10. In FIG. 8, vectors $T_1$, $T_2$, $T_3$, $T_4$, $T_5$, $T_6$, $T_7$, $T_8$, and $T_9$ are respectively assigned to words "Traces", "are", "formed", "on", "a", "printed", "circuit", "board", and "." obtained by dividing by morphological analysis and the like.

The words "printed", "circuit", and "board" are herein originally a compound "printed-circuit-board", but are generated by dividing the compound.

Next, these vectors are adjusted in the plurality of tiers of the hidden layers 34 of the learned model 10.

Next, the acquisition unit 12 acquires a vector from the learned model 10. In particular, the acquisition unit 12 acquires adjusted vectors (the vectors $T_6$, $T_7$, and $T_8$ in FIG. 8) corresponding to the respective words obtained by dividing the compound as shown in FIG. 9.

Next, the acquisition unit 12 generates a vector corresponding to the compound (i.e., "printed-circuit-board") based on the vectors $T_6$, $T_7$, and $T_8$.

Next, the similarity degree calculation unit 14 calculates a degree of similarity between one word and another word.

FIG. 7 shows examples of results of the degree of similarity calculated by the similarity degree calculation unit 14. In FIG. 7, an upper row shows a plurality of synonyms of a compound in a case where vectors of words obtained by dividing the compound are corresponding initial vectors held by the learned model 10, and a lower row shows a plurality of synonyms of the compound in a case where the vectors of the words obtained by dividing the compound are adjusted vectors output from the learned model 10 by the above-mentioned operation. Synonyms herein refer to words having a degree of similarity with the compound equal to or greater than a predetermined threshold.

As shown in an example of FIG. 7, it can be seen from comparison between the upper row and the lower row that more appropriate words as the synonyms of the compound (not words simply having similar character strings but words having similar meanings to the compound) are listed in the lower row than in the upper row, and that, by the operation shown in FIG. 4, the compound vector corresponding to the compound reflects the context in the piece of text, and classification accuracy of the compound vector is enhanced.

<Effects Produced by Embodiment Described Above>

Examples of effects produced by the embodiment described above will be described next. In description made below, the effects will be described based on a specific configuration whose example is shown in the embodiment described above, but the specific configuration may be replaced by another specific configuration whose example is shown in the description of the present application to the extent that similar effects are produced. That is to say, only one of corresponding specific configurations will sometimes be described as a representative below for the sake of convenience, but the specific configuration described as the representative may be replaced by another corresponding specific configuration.

According to the embodiment described above, in a vector acquisition method, a compound is a word divisible into a plurality of words. At least one piece of text including at least two of the plurality of words obtained by dividing the compound is input into the learned model 10. An adjusted vector corresponding to at least one of the words obtained by dividing the compound in the input piece of text is output from the learned model 10. A compound vector corresponding to the compound is acquired using the adjusted vector output from the learned model 10.

According to such a configuration, the compound vector corresponding to the compound can be acquired using the adjusted vector, so that the compound vector can reflect a relationship between words obtained by dividing the compound in the input piece of text. The classification accuracy (representation accuracy) of the compound vector can thereby be improved.

Unless specifically limited otherwise, a processing order can be changed.

Similar effects can be produced in a case where another configuration whose example is shown in the description of the present application is added to the above-mentioned configuration as appropriate, that is, in a case where another configuration in the description of the present application having not been referred to as the above-mentioned configuration is added to the above-mentioned configuration as appropriate.

According to the embodiment described above, in inputting the piece of text into the learned model 10, the piece of text includes words obtained by dividing a compound corresponding to an initial vector not held by the learned model 10. According to such a configuration, the compound vector corresponding to the initial vector not held can be acquired using the adjusted vector. Thus, compared with a case where the corresponding initial vector is acquired from the embedding layer 32, and the compound vector is generated based on the initial vector, the compound vector reflects the relationship between words obtained by dividing the compound in the piece of text. The classification accuracy (representation accuracy) of the compound vector can thereby be improved.

According to the embodiment described above, the vector acquisition method further includes calculating a degree of similarity between words including the compound using vectors corresponding to the respective words and including the compound vector acquired using the adjusted vector. According to such a configuration, the degree of similarity between words can be calculated using the compound vector with improved classification accuracy (representation accuracy), so that the accuracy of calculation of the degree of similarity can be improved.

According to the embodiment described above, in acquiring the compound vector, an average value of adjusted vectors corresponding to the same words included in respective pieces of text and obtained by dividing compounds is used. According to such a configuration, a difference between the same words in the respective pieces of text is considered, so that the classification accuracy (representation accuracy) of the acquired compound vector can be enhanced.

According to the embodiment described above, in acquiring the compound vector, vectors corresponding to the respective words obtained by dividing the compound are averaged. According to such a configuration, the compound vector is acquired by combining a plurality of vectors, so that the classification accuracy (representation accuracy) of the acquired compound vector can be enhanced.

According to the embodiment described above, the learned model 10 is a language encoding model based on a transformer. According to such a configuration, the context in the piece of text is considered to improve the classification accuracy of the generated vectors.

According to the embodiment described above, in inputting the piece of text into the learned model 10, the piece of text input into the learned model 10 includes the compound. According to such a configuration, all the words obtained by dividing the compound are included in a single piece of text, so that adjusted vectors corresponding to these words can efficiently be output. Furthermore, the compound is used as it is in the piece of text, so that the relationship between words obtained by dividing the compound in the piece of text matches the meaning of the compound, and thus the classification accuracy (representation accuracy) of the adjusted vectors as output can be improved.

According to the embodiment described above, a vector acquisition apparatus is a vector acquisition apparatus using the learned model 10 holding initial vectors corresponding to respective words, and capable of outputting, for input of a piece of text including a plurality of words, adjusted vectors corresponding to the respective words in the piece of text, the initial vectors being vectors learned in advance, the adjusted vectors being vectors obtained by adjusting the initial vectors. The vector acquisition apparatus includes the input unit 18 and the acquisition unit 12. The input unit 18 inputs, into the learned model 10, at least one piece of text including at least two of a plurality of words obtained by dividing a compound. The acquisition unit 12 acquires a compound vector corresponding to the compound using an adjusted vector output from the learned model 10 and corresponding to at least one of the words obtained by dividing the compound in the input piece of text.

Furthermore, according to the embodiment described above, the vector acquisition apparatus includes the CPU 102 as a processing circuit to execute a program and the HDD 104 as a storage device to store the executed program 105. The CPU 102 executes the program 105 to achieve the following operation.

That is to say, at least one piece of text including at least two of a plurality of words obtained by dividing a compound is input into the learned model 10. A compound vector corresponding to the compound is acquired using an adjusted vector output from the learned model 10 and corresponding to at least one of the words obtained by dividing the compound in the input piece of text.

According to such a configuration, the compound vector corresponding to the compound can be acquired using the adjusted vector, so that the classification accuracy (representation accuracy) of the compound vector can be improved.

Similar effects can be produced in a case where another configuration whose example is shown in the description of the present application is added to the above-mentioned configuration as appropriate, that is, in a case where another configuration in the description of the present application having not been referred to as the above-mentioned configuration is added to the above-mentioned configuration as appropriate.

According the embodiment described above, a vector acquisition program causes, using a plurality of instructions to be executed by a processor (the CPU 102), the computer to input, into the learned model 10, at least one piece of text including at least two of a plurality of words obtained by dividing a compound. The computer is also caused to acquire a compound vector corresponding to the compound using an adjusted vector output from the learned model 10 and corresponding to at least one of the words obtained by dividing the compound in the input piece of text.

According to such a configuration, the compound vector corresponding to the compound can be acquired using the adjusted vector, so that the classification accuracy (representation accuracy) of the compound vector can be improved.

Similar effects can be produced in a case where at least one of the other configurations whose examples are shown in the description of the present application is added to the above-mentioned configuration as appropriate, that is, in a case where another configuration which has not been referred to as the above-mentioned configuration and whose example is shown in the description of the present application is added to the above-mentioned configuration as appropriate.

The above-mentioned program may be recorded on a computer-readable portable recording medium, such as a magnetic disk, a flexible disk, an optical disc, a compact disc, a Blu-ray Disc™, and a DVD. A portable recording medium on which a program to achieve the above-mentioned functions is recorded may commercially be distributed.

<Modifications of Embodiment Described Above>

In the embodiment described above, dimensions of, shapes of, a relative positional relationship among, or conditions for performance of components are sometimes described, but they are each one example in all aspects, and are not restrictive.

Numerous modifications whose examples are not shown and the equivalents are devised within the scope of the technology disclosed in the description of the present application. For example, a case where at least one component is modified, added, or omitted is included.

In a case where a name of a material and the like are described in the above-mentioned embodiment without being particularly designated, an alloy and the like containing an additive in addition to the material may be included unless any contradiction occurs.

Components described in the embodiment described above are devised as software or firmware, or hardware corresponding thereto, and are referred to as "units", "processing circuitry", or the like in both of the concepts.

While the invention has been shown and described in detail, the foregoing description is in all aspects illustrative and not restrictive. It is therefore understood that numerous modifications and variations can be devised without departing from the scope of the invention.

What is claimed is:

1. A vector acquisition method using a learned model holding initial vectors corresponding to respective words, and capable of outputting, for input of a piece of text including a plurality of words, adjusted vectors corresponding to the respective words in the piece of text, the initial vectors being vectors learned in advance, the adjusted vectors being vectors obtained by adjusting the initial vectors, the vector acquisition method comprising:
    inputting, into the learned model, at least one piece of text including at least two of a plurality of words obtained by dividing a compound, the compound being a word divisible into the plurality of words;
    outputting, from the learned model, an adjusted vector corresponding to at least one of the words obtained by dividing the compound in the input piece of text; and
    acquiring a compound vector corresponding to the compound using the adjusted vector output from the learned model.

2. The vector acquisition method according to claim 1, wherein
    in inputting the piece of text into the learned model, the piece of text includes words obtained by dividing a compound corresponding to an initial vector not held by the learned model.

3. The vector acquisition method according to claim 1, further comprising
    calculating a degree of similarity between words including the compound using vectors corresponding to the respective words and including the compound vector acquired using the adjusted vector.

4. The vector acquisition method according to claim 1, wherein
    in acquiring the compound vector, an average value of adjusted vectors corresponding to the same words included in respective pieces of text and obtained by dividing compounds is used.

5. The vector acquisition method according to claim 1, wherein
    in acquiring the compound vector, vectors corresponding to the respective words obtained by dividing the compound are averaged.

6. The vector acquisition method according to claim 1, wherein
    the learned model is a language encoding model based on a transformer.

7. The vector acquisition method according to claim 1, wherein
    in inputting the piece of text into the learned model, the piece of text input into the learned model includes the compound.

8. A vector acquisition apparatus using a learned model holding initial vectors corresponding to respective words, and capable of outputting, for input of a piece of text including a plurality of words, adjusted vectors corresponding to the respective words in the piece of text, the initial vectors being vectors learned in advance, the adjusted vectors being vectors obtained by adjusting the initial vectors, and achieved by a central processing unit (CPU) executing a program, the vector acquisition apparatus comprising:
    an input unit to input, into the learned model, at least one piece of text including at least two of a plurality of words obtained by dividing a compound, the compound being a word divisible into the plurality of words; and
    an acquisition unit to acquire a compound vector corresponding to the compound using an adjusted vector output from the learned model and corresponding to at least one of the words obtained by dividing the compound in the input piece of text.

9. A recording medium storing a vector acquisition program using a learned model and having a plurality of instructions capable of being executed by a computer to be executed by one or more processors, the learned model holding initial vectors corresponding to respective words, and capable of outputting, for input of a piece of text including a plurality of words, adjusted vectors corresponding to the respective words in the piece of text, the initial vectors being vectors learned in advance, the adjusted vectors being vectors obtained by adjusting the initial vectors, the vector acquisition program being installed on a computer and executed to:
    cause, using the plurality of instructions to be executed by the one or more processors, the computer to input, into the learned model, at least one piece of text including at least two of a plurality of words obtained by dividing a compound, the compound being a word divisible into the plurality of words; and
    cause the computer to acquire a compound vector corresponding to the compound using an adjusted vector output from the learned model and corresponding to at least one of the words obtained by dividing the compound in the input piece of text.

* * * * *